US008665179B2

(12) United States Patent
Oda

(10) Patent No.: US 8,665,179 B2
(45) Date of Patent: Mar. 4, 2014

(54) PROJECTION APPARATUS, PROJECTION METHOD, AND STORAGE MEDIUM HAVING PROGRAM STORED THEREON

(75) Inventor: Kiyoshi Oda, Hino (JP)

(73) Assignee: Casio Computer Co., Ltd., Tokyo (JP)

(*) Notice: Subject to any disclaimer, the term of this patent is extended or adjusted under 35 U.S.C. 154(b) by 121 days.

(21) Appl. No.: 13/456,737

(22) Filed: Apr. 26, 2012

(65) Prior Publication Data
US 2012/0274678 A1 Nov. 1, 2012

(30) Foreign Application Priority Data

Apr. 28, 2011 (JP) ................................. 2011-102163

(51) Int. Cl.
*G09G 5/00* (2006.01)
(52) U.S. Cl.
USPC .................................................. 345/8; 345/7
(58) Field of Classification Search
USPC .......................................... 345/7, 8, 32, 204
See application file for complete search history.

(56) References Cited

U.S. PATENT DOCUMENTS

2010/0188489 A1  7/2010  Mashitani et al.
2011/0001808 A1  1/2011  Mentz et al.

FOREIGN PATENT DOCUMENTS

JP     08-331603 A    12/1996
JP     2008-292953 A  12/2008

OTHER PUBLICATIONS

Extended European Search Report (EESR) dated Jul. 19, 2012 (in English) in counterpart European Application No. 12165593.0.
Japanese Office Action dated May 21, 2013 (and English translation thereof) in counterpart Japanese Application No. 2011-102163.

*Primary Examiner* — Ricardo L Osorio
(74) *Attorney, Agent, or Firm* — Holtz, Holtz, Goodman & Chick, PC

(57) ABSTRACT

A light emission state of each of the plurality of different types of light-emitting elements is controlled in accordance with i) a color image formation period in which a color image is formed by using light emitted from the different types of light-emitting elements, ii) a synchronization period in which at least two different types of light-emitting elements are simultaneously driven to output a synchronization signal synchronized with projection timing of a left-eye image or a synchronization signal synchronized with projection timing of a right-eye image, and iii) off-state periods between which the synchronization period is interposed, and in which all the light-emitting elements are in the off-state.

6 Claims, 4 Drawing Sheets

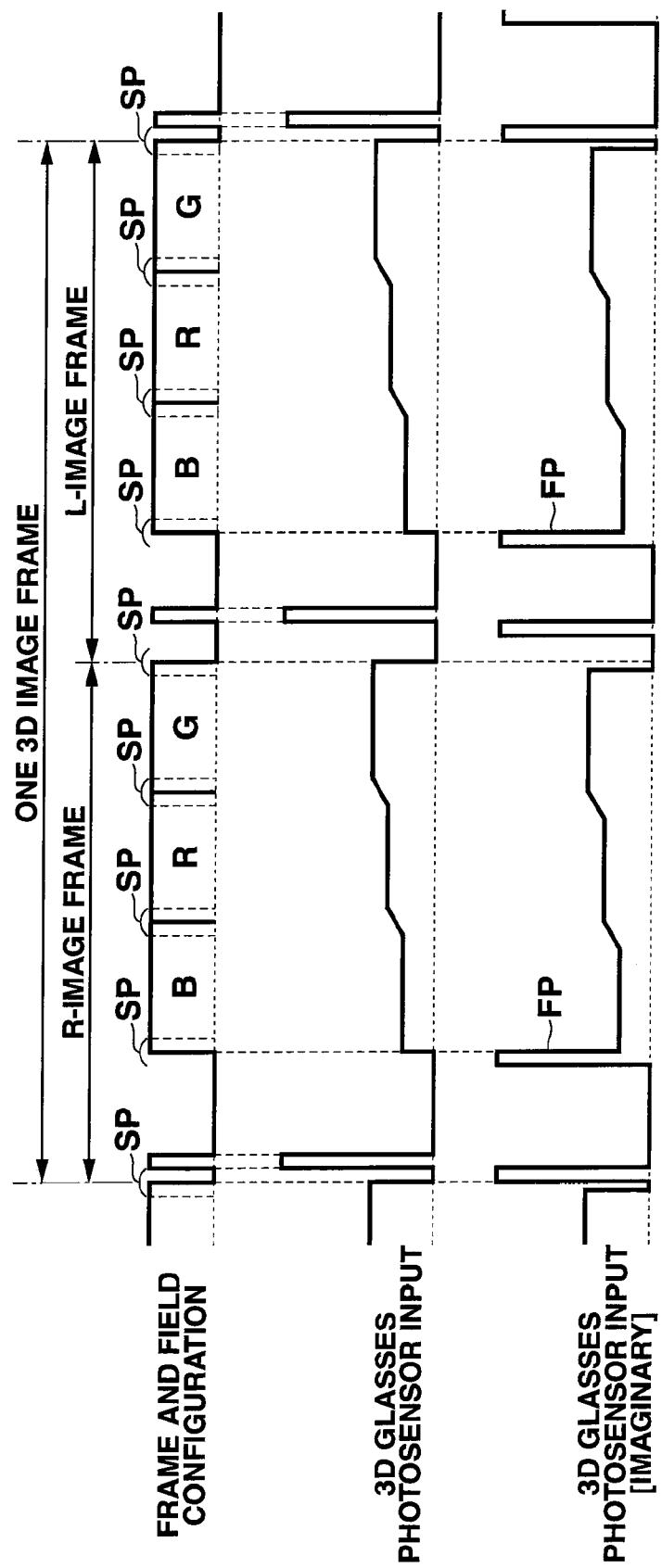

US 8,665,179 B2

PROJECTION APPARATUS, PROJECTION METHOD, AND STORAGE MEDIUM HAVING PROGRAM STORED THEREON

CROSS-REFERENCE TO RELATED APPLICATIONS

This application is based upon and claims the benefit of priority from prior Japanese Patent Application No. 2011-102163, filed Apr. 28, 2011, the entire contents of which are incorporated herein by reference.

BACKGROUND OF THE INVENTION

1. Field of the Invention

The present invention relates to a projection apparatus, projection method, and storage medium having program stored thereon program, suitable for a projector or the like of, for example, the digital light processing (DLP) (registered trademark) system.

2. Description of the Related Art

In recent years, projectors of the DLP (registered trademark) system are becoming widespread.

In a projector of the DLP (registered trademark) system, a micromirror element forms an optical image by the overall pixels by a modulating operation of reflecting light from a projection light source in the direction of the projection optical system for a time width corresponding to the gradation for each pixel position.

The light component which has not been reflected in the direction of the projection optical system, so-called off light is applied to a nonreflecting part set in advance to be converted into heat, and is finally discharged to the outside of the housing.

As described above, in the projector of the DLP (registered trademark) system, how efficiently discharge the heat attributable to the off light, and filling the inside to the outside leads to a stable projection operation, and hence various proposals are made in this regard. (for example, Jpn. Pat. Appln. KOKAI Publication No. 2008-292953)

Incidentally, in the field of television or video, a technique of displaying a three-dimensional image has been put to practical use, and two or three three-dimensional projection systems are investigated also regarding the projector.

Among these, as one of the systems in which an image for the left eye, and image for the right eye are alternately projected by using 3D liquid crystal glasses, a technique of providing a field period in which a synchronization pulse of, for example, white color having higher illuminance is projected during an extremely-short time which is not perceptible to the naked eye, in a synchronization signal for switching between right-eye image projection and left-eye image projection separately from a field period in which an image of each of colors of red, green, and blue is projected, is considered.

In this technique, during the field period including the synchronization pulse, and liquid crystal response time subsequent thereto, all the brighter white light is disposed of as off light other than the timing at which the pulse is projected.

Accordingly, almost all the light brighter than that at the time of normal optical image formation is disposed of as off light, and hence the amount of heat to be discharged as a result is great, whereby there is a problem that the heat radiation unit is inevitably made larger.

BRIEF SUMMARY OF THE INVENTION

Accordingly, it is an object of the present invention to provide a projection apparatus, projection method, and program stored in a storage medium, capable of reducing the amount of generated heat at the time of three-dimensional image projection.

According to one aspect of the present invention, there is provided a projection apparatus comprising: a plurality of different types of light-emitting elements configured to emit light of different wavelength ranges; a light source drive unit configured to control a light emission state of each of the plurality of different types of light-emitting elements in accordance with i) a color image formation period in which a color image is formed by using light emitted from the plurality of different types of light-emitting elements, ii) a synchronization period in which at least two different types of light-emitting elements of the plurality of different types of light-emitting elements are simultaneously driven to output a synchronization signal synchronized with projection timing of a left-eye image or a synchronization signal synchronized with projection timing of a right-eye image, and iii) off-state periods between which the synchronization period is interposed, and in which all the plurality of different types of light-emitting elements are in the off-state; an input unit configured to input an image signal for the left eye and an image signal for right eye; and a projection unit configured to switch between a) an optical image corresponding to an image signal for the left eye and b) an optical image corresponding to an image signal for the right eye, which are input by the input unit, to thereby project one of the optical images by using light emitted from the plurality of different types of light-emitting elements driven by the light source drive unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a timing chart of light source drive at the time of 3D image projection involving color adjustment.

DETAILED DESCRIPTION OF THE INVENTION

Hereinafter, embodiments of the case where the present invention is applied to a data projector apparatus of the DLP (registered trademark) system will be described with reference to the drawings.

First Embodiment

Figure 1:
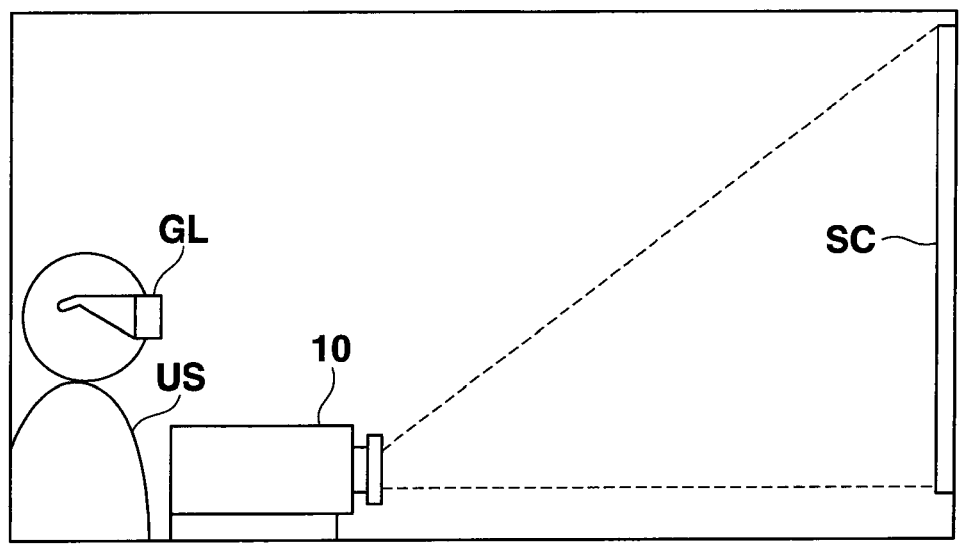
FIG. 1 is a view showing the projection environment of a data projector apparatus according to a first embodiment of the present invention.

FIG. 1 is a view showing the projection environment of a data projector apparatus 10 according to a first embodiment.

As shown in FIG. 1, the user US wearing 3d liquid crystal glasses GL enjoys an image projected onto a screen SC from a data projector apparatus 10.

Figure 2:
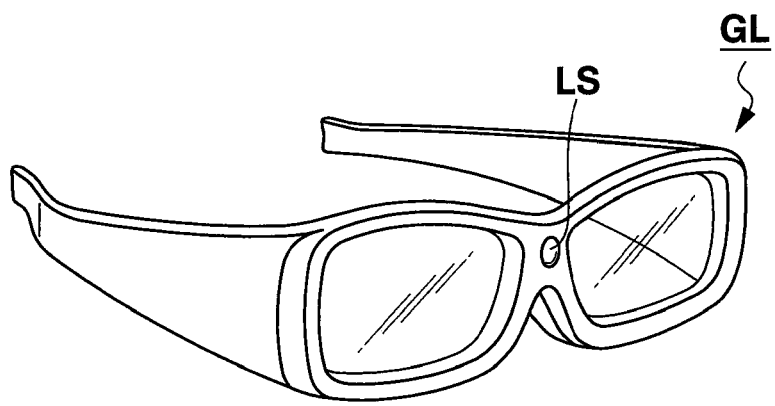
FIG. 2 is a perspective view showing the external configuration of a 3D liquid crystal glasses according to the first embodiment.

FIG. 2 is a perspective view showing the external configuration of the 3D liquid crystal glasses GL.

The 3D liquid crystal glasses GL are overglasses which can be duplicately used even when the user US is an eyeglass wearer, and a light-receiving sensor LS is arranged on the front side of a bridge part in the center.

Upon being directed to the screen SC, the light-receiving sensor LS detects a change in luminance on the screen SC surface.

By alternately shading/transparentizing the right and left lenses in synchronism with a synchronization signal, which is superposed on the projected image, and is received by the light-receiving sensor LS, it becomes possible for the user US to enjoy a three-dimensional image.

The configuration itself of the 3D liquid crystal glasses GL has basically the same configuration as an existing liquid crystal shutter glasses of the frame-sequential system, and hence descriptions of the internal circuit configuration, operations, and the like are omitted.

Next, the schematic configuration of a functional circuit in the data projector apparatus 10 described above will be described below by using FIG. 3.

An input unit 11 includes, for example, a video input terminal of the pin jack (RCA) type, RGB input terminal of the D-sub15 type or the like.

An analog image signal conforming to various standards input to the input unit 11 is digitized in the input unit 11, and is thereafter sent to an image conversion unit 12 through a system bus SB.

The image conversion unit 12 is also called a scaler, unifies input image data into image data of a predetermined format suitable for projection, and sends the resultant image data to a projection processing unit 13.

The projection processing unit 13 drives a micromirror element 14 which is a spatial optical modulator by time-division drive of higher speed obtained by continual multiplication of a frame rate conforming to a predetermined format, for example, 120 frames per second, division number of color components, and display gradation number to be carried out in accordance with the image data sent thereto to thereby cause the element 14 to carry out display.

The micromirror element 14 individually subjects each of inclination angles of a plurality of micromirrors arranged in a form of an array corresponding to, for example, a wide extended graphic array (WXGA) (1280 pixels in the lateral direction×800 pixels in the longitudinal direction) to an on/off operation at high speed to display an image, whereby an optical image is formed by the reflected light.

On the other hand, primary-color light components of red, green, and blue are cyclically emitted from a light source unit 15 by time division. Each of the primary-color light components from the light source unit 15 is subjected to total reflection by a mirror 16 to be applied to the micromirror element 14.

Further, an optical image is formed by the light reflected from the micromirror element 14, and the formed optical image is projection-displayed on a screen (not shown) serving as a projection object through a projector lens unit 17.

The light source unit 15 includes a laser diode (LD) 18 emitting blue laser light.

The blue laser light emitted from the LD 18 is transmitted through a dichroic mirror 19, and is thereafter applied to a circumferential surface of a fluorescent wheel 20.

The fluorescent wheel 20 is rotated by a wheel motor (M) 21, and a fluorescent substance layer 20g is formed over the entire circumferential surface to which the blue laser light is applied.

A reflecting plate (not shown) is provided on the back surface of the part of the fluorescent wheel 20 on which the fluorescent substance layer 20g is formed such that the plate is laid on the fluorescent substance layer 20g.

Further, a wheel marker (not shown) indicating a reference rotational position configured to achieve rotational synchronism of the fluorescent wheel 20 is provided at an end point on the circumferential surface of the fluorescent wheel 20.

In this embodiment, it is assumed that the fluorescent wheel 20 accurately makes one revolution in synchronism with a period of one frame of a color image, by 360°, and the wheel marker passes a position of a marker sensor 22 closely arranged in opposition to the wheel marker at the start timing of the above one frame.

The above-mentioned projection processing unit 13 receives a detection output of the marker sensor 22 to detect the rotational state of the fluorescent wheel 20.

By applying the blue laser light to the fluorescent substance layer 20g of the fluorescent wheel 20, green light is excited as the reflected light.

The green light is reflected by the dichroic mirror 19, and is then transmitted through a dichroic mirror 23 to reach the mirror 16 described above.

Furthermore, the light source unit 15 includes a light emitting diode (LED) 24 emitting red light and an LED 25 emitting blue light.

The red light emitted from the LED 24 is reflected by a dichroic mirror 26, is further reflected by the dichroic mirror 23 too, and thereafter reaches the mirror 16.

The blue light emitted from the LED 25 is reflected from a mirror 27, is then passed through the dichroic mirror 26, is thereafter reflected from the dichroic mirror 23, and reaches the mirror 16.

As described above, the dichroic mirror 19 transmits the blue light, whereas it reflects the green light.

The dichroic mirror 23 transmits the green light, whereas it reflects the red light and blue light.

The dichroic mirror 26 reflects the red light, whereas it transmits the blue light.

The projection processing unit 13 executes formation of an optical image based on the image display carried out by the micromirror element 14, light, emission of the LD 18, and LEDs 24 and 25, rotation of the fluorescent wheel 20 by the wheel motor 21, and detection of the rotational timing of the fluorescent wheel 20 carried out by the marker sensor 22 under the control of a CPU 28 to be described later.

All the operations of the above-mentioned circuits are controlled by the CPU 28.

The CPU 28 is directly connected to a main memory 29 and a program memory 30.

The main memory 29 is constituted of, for example, an SRAM, and functions as a work memory of the CPU 28.

The program memory 30 is constituted of an electrically rewritable nonvolatile memory, and stores therein an operation program to be executed by the CPU 28, various stylized data items, and the like.

The CPU 28 executes control operations in the data projector apparatus 10 by using the main memory 29 and the program memory 30.

The CPU 28 executes various projection operations in accordance with key operation signals from an operation unit 31.

The operation unit 31 includes a key operation unit provided on the main body of the data projector apparatus 10, and laser receiving unit configured to receive infrared light from a remote controller (not shown) dedicated to the data projector apparatus 10, and directly outputs a key operation signal based on a key operated by the user by using the key operation unit of the main body or by using the remote controller, to the CPU 28.

The CPU 28 is further connected also to a sound processing unit 32 through the system bus SB.

The sound processing unit 32 is provided with a sound source circuit such as a PCM sound source or the like, converts the sound data supplied thereto at the time of the projection operation into analog data, drives a speaker unit 33 to project the sound or generate beep sound or the like as the need arises.

Next, operations of the embodiment will be described below.

It should be noted that although a description is given in a repetitive manner, all the operations to be shown below are executed after an operation program, fixed data, and the like read by the CPU 28 from the program memory 30 are spread on the main memory 29 to be stored therein.

Further, in order to simplify the explanation, it is assumed that one frame of a color image for each of the left eye and right eye is projected in synchronism with the one rotational period (360°) of the fluorescent wheel 20.

It is assumed that the one frame is constituted of, for example, a field for synchronization, and three fields of blue, red, and green, i.e., four fields in total, and a time corresponding to 90° of the central angle at the time of rotation of the fluorescent wheel 20 is set in each field.

Figure 4:
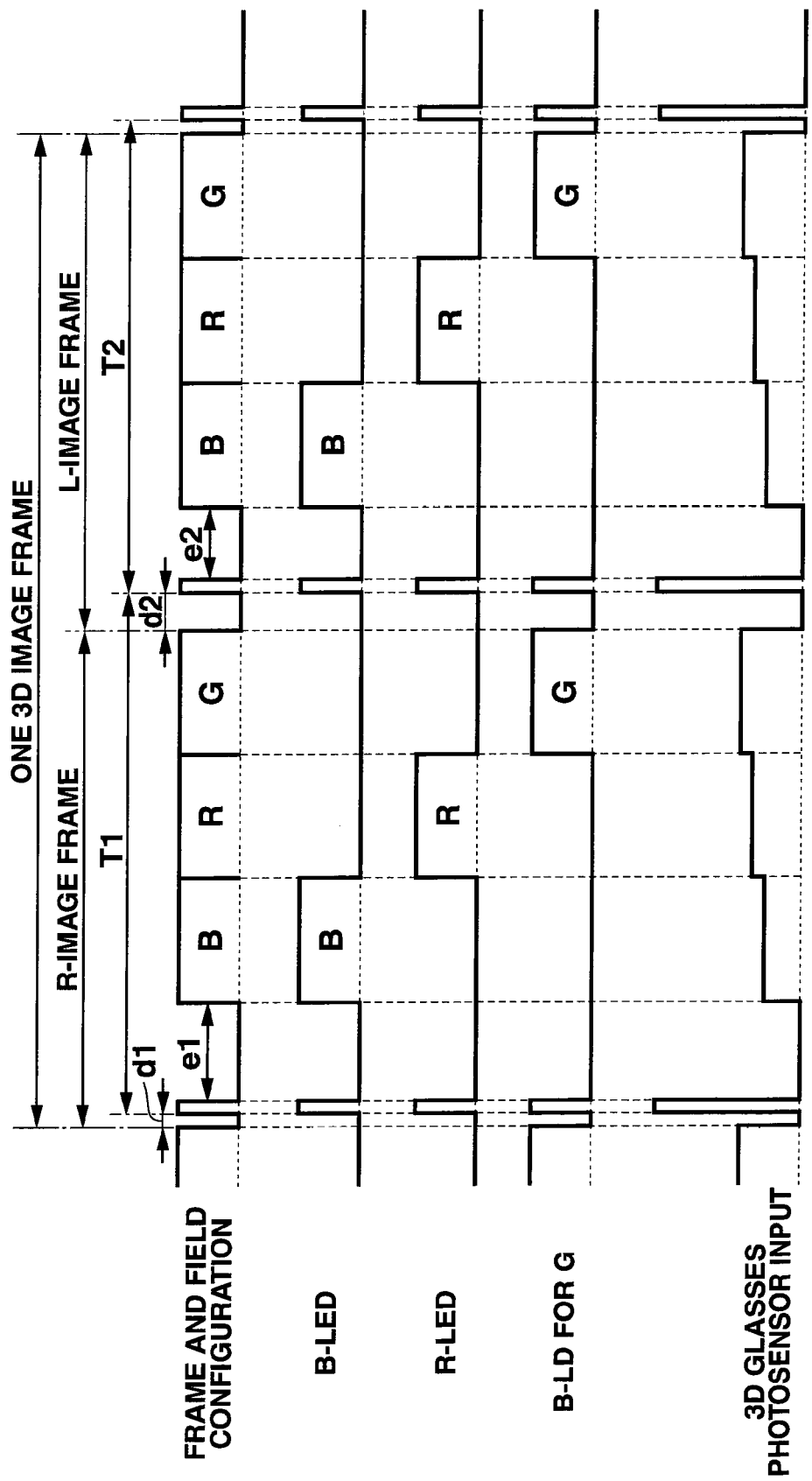
FIG. 4 is a timing chart of light source drive at the time of 3D image projection according to the first embodiment.

FIG. 4 shows the light emission timing at the light source unit 15 in the two frames, i.e., the one R-image frame and the one L-image frame both of which constitute the one 3D image frame, and the input level of the light-receiving sensor LS of the 3D liquid crystal glasses GL.

In the R-image frame, at the beginning of the synchronization field, each of the LD 18, LED 24, and LED 25 which is a semiconductor light-emitting element serving as the light source is in the off-state and, from the timing at which a time d1 has elapsed, the LD 18, LED 24, and LED 25 are simultaneously set to the on-state by the projection processing unit 13 for a time corresponding to a prescribed pulse width, for example, a time corresponding to 2° in terms of the rotational angle of the fluorescent wheel 20.

Accordingly, white light constituted of a compound color of the green, red, and blue color components is applied to the micromirror element 14 and, during this time, the micromirror element 11 makes all the applied light the reflection light in the direction to the projector lens unit 17 by total reflection.

Accordingly, an image of high luminance having the white color on the entire surface thereof is projected onto the screen SC for an extremely short time which cannot be perceived by the user US.

After that, each of the LD 18, LED 24, and LED 25 is set to the off-state for a time e1 until the field for synchronization ends, again.

This off-state time becomes, on the 3D liquid crystal glasses GL side, a response time configured to open the liquid crystal shutter of the right-eye lens next, and to show the right-eye image.

In the next B field, only the LED 25 is on-driven for a time corresponding to 90° in terms of the rotational angle of the fluorescent wheel 20.

By the blue light emitted from the LED 25, the micromirror element 14 forms a blue optical image for the right eye, and the optical image is projected onto the screen SC by the projector lens unit 17.

In the next R field, only the LED 24 is on-driven for a period corresponding to 90° in terms of the rotational angle of the fluorescent wheel 20.

By the red light emitted from the LED 24, the micromirror element 14 forms a red optical image for the right eye, and the optical image is projected onto the screen SC by the projector lens unit 17.

In the next G field, only the LD 18 is on-driven for a period corresponding to 90° in terms of the rotational angle of the fluorescent wheel 20.

By the green light obtained by applying the blue light emitted from the LD 18 to the fluorescent substance layer 20g of the fluorescent wheel 20, the micromirror element 14 forms a green optical image for the right eye, and the optical image is projected onto the screen SC by the projector lens unit 17.

In the subsequent L-image frame, at the beginning of the synchronization field, each of the LD 18, LED 24, and LED 25 which is a semiconductor light-emitting element serving as the light source is in the off-state and, from the timing at which a time d2 has elapsed, the LD 18, LED 24, and LED 25 are simultaneously set to the on-state by the projection processing unit 13 for a time corresponding to a prescribed pulse width, for example, a time corresponding to 2° in terms of the rotational angle of the fluorescent wheel 20.

Accordingly, white light constituted of a compound color of the green, red, and blue color components is applied to the micromirror element 14 and, during this time, the micromirror element 14 makes all the applied light the reflection light in the direction to the projector lens unit 17 by total reflection.

Accordingly, an image of high luminance having the white color on the entire surface thereof is projected onto the screen SC for an extremely short time which cannot be perceived by the user US.

After that, each of the LD 18, LED 24, and LED 25 is set to the off-state for a time e2 until the field for synchronization ends, again.

This off-state time becomes, on the 3D liquid crystal glasses GL side, a response time configured to open the liquid crystal shutter of the left-eye lens next, and to show the left-eye image.

In the subsequent B field, only the LED 25 is on-driven for a time corresponding to 90° in terms of the rotational angle of the fluorescent wheel 20.

By the blue light emitted from the LED 25, the micromirror element 14 forms a blue optical image for the left eye, and the optical image is projected onto the screen SC by the projector lens unit 17.

In the next R field, only the LED 24 is on-driven for a period corresponding to 90° in terms of the rotational angle of the fluorescent wheel 20.

By the red light emitted from the LED 24, the micromirror element 14 forms a red optical image for the left eye, and the optical image is projected onto the screen SC by the projector lens unit 17.

In the next G field, only the LD 18 is on-driven for a period corresponding to 90° in terms of the rotational angle of the fluorescent wheel 20.

By the green light obtained by applying the blue light emitted from the LD 18 to the fluorescent substance layer 20g of the fluorescent wheel 20, the micromirror element 14 forms a green optical image for the left eye, and the optical image is projected onto the screen SC by the projector lens unit 17.

As above delay time d2 at the beginning of the frame, a value greater than delay time d1 used in the R-image frame is set.

Accordingly, due to a difference Δd (=d2−d1) in the delay time, regarding period T1 from the time at which the pulse for synchronization is emitted in the R-image frame to the time at which the pulse for synchronization is emitted in the L-image frame, and period T2 from the time at which the pulse for synchronization is emitted in the L-image frame to the time at which the pulse for synchronization is emitted in the R-image frame belonging to the next one 3D image frame, period T1 is longer than period T2 by 2Δd.

The 3D glasses photosensor input of FIG. 4 exemplifies the intensity of light incident on the light-receiving sensor LS in the case where the 3D liquid crystal glasses GL are directed to the screen SC during image projection.

In each of the B, R, and G fields, an incident light amount for an optical image formed by emitting light from each monochromic semiconductor light-emitting element is shown, and hence, for example, due to the difference between the color components in luminance, the incident light amount becomes greater in the order of B<R<G.

Conversely, regarding the synchronization pulse at the beginning of each frame, the amount of light is an amount of light for the compound color resulting from simultaneous emission of the three colors, and hence it is easy to readily recognize only the synchronization pulse.

Moreover, by measuring the periods T between the synchronization pulses, and comparing the measured periods with each other, it can be easily determined whether the image to be projected subsequently to the synchronization pulse is an image for the right eye or an image for the left eye.

In the data projector apparatus 10, among the fields each of which includes the synchronization pulse, the period in which the three different types of light-emitting elements LD 18, LED 24, and LED 25 simultaneously emit light is only the period of the synchronization pulse and, in the micromirror element 14, full-tone display is carried out on the entire surface thereof in synchronism with the synchronization pulse, and the emitted light is projected onto the screen by the projector lens unit 17.

Accordingly, there is almost no thermal load due to simultaneous drive of the plurality of light-emitting elements in the field including the synchronization pulse, and within the periods before and after the synchronization pulse, all the light-emitting elements are in the off-state, and hence it is possible to simply reduce the amount of generated heat.

Not only that, by the off-state, the temperature of each light-emitting element becomes lower, and it is possible to improve the luminous efficiency of each light-emitting element.

Second Embodiment

Hereinafter, a second embodiment of the present invention will be described.

Figure 3:
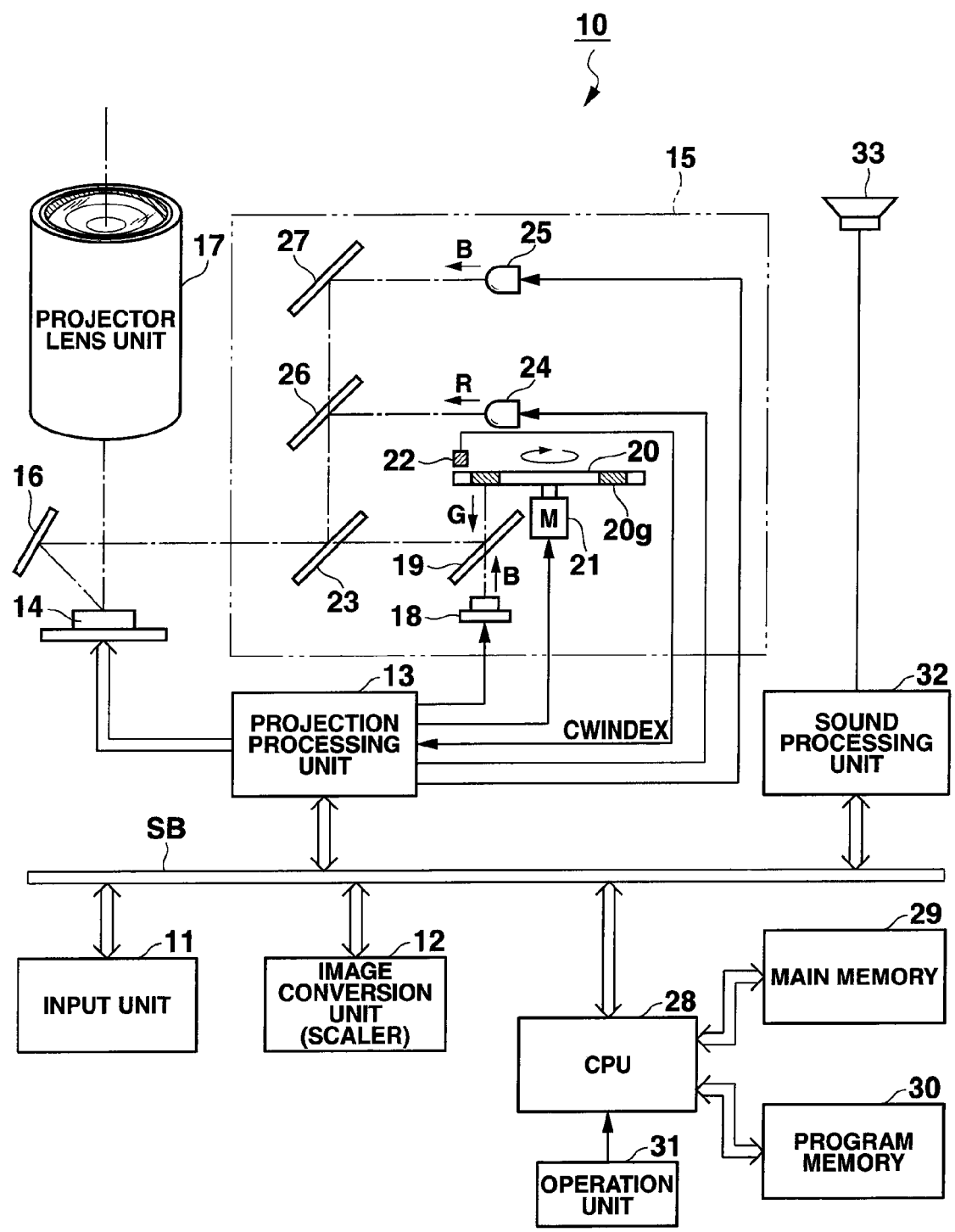
FIG. 3 is a block diagram showing the schematic configuration of a functional circuit of the data projector apparatus according to the first embodiment.

It should be noted that the projection environment of a data projector apparatus 10 according to this embodiment is regarded as basically identical to FIG. 1, the external configuration of 3D liquid crystal glasses GL is regarded as basically identical to FIG. 2, and the schematic configuration of a functional circuit of the data projector apparatus 10 is regarded as basically identical to FIG. 3, and identical parts are denoted by identical reference symbols, and illustration and description of them are omitted.

Next, operations of the embodiment will be described below.

FIG. 5 is a timing chart for explaining an operation to be carried out when adjustment of the halftone is carried out.

In FIG. 4, although the boundary part between the field for synchronization, and each of the B, G, and R fields for color image projection is made definite, and the timing or the like of switching the light source of each color is not mentioned, here the case where adjustment of the timing is carried out is considered.

That is, in this embodiment, an LD 18, LED 24, and LED 25 which are light source elements configured to emit light of green, red, and blue, respectively are provided separately from each other.

Accordingly, by adjusting the width of the light emission period and timing of each element, it becomes possible to carry out adjustment of the dynamic range of the luminance and halftone.

The frame and field configuration of FIG. 5 show the frame and field configuration at the time of 3D image projection and, as in the case of FIG. 4, one 3D image frame is constituted of an R-image frame and an L-image frame.

Each of the periods which is located in the boundary of each field periods, and is shown with a parenthesis line in FIG. 5 is called a "spoke period" on the basis of the way of calling in the projector of the DLP (registered trademark) system using the general color wheel.

In this embodiment, it is assumed that in the synchronization field, and G, R, and B fields except the spoke fields, each of the elements is set to the on-state without fail, and the time width and timing of the on-state of each light source element in the spoke period are adjustable.

By carrying out such adjustment, it becomes possible to variably set the expression of a dynamic range and halftone of each color.

Particularly, by adjusting the light-emission timing of each color in the front-back direction, it becomes possible to finely adjust the balance of color in terms of gradation expression.

The 3D glasses photosensor input of FIG. 5 exemplifies the intensity of light incident on the light-receiving sensor LS in the case where the 3D liquid crystal glasses GL are directed to the screen Sc in a state where color adjustment can be correctly made.

Conversely, a case where correct adjustment of timing cannot be made, and differences in light-emission timing between each color occur is considered.

Unless each of the light-emitting elements is set to the off-state during the period from the time immediately after the synchronization pulse to the next B field, particularly in the spoke period positioned between the synchronization field and the subsequent B field as has been described in connection with FIG. 4, there occurs, depending on the direction in which the timing is shifted, a possibility of projection light based on the light emission being projected through the projector lens unit 17 in the spoke period and, as a result, a possibility of a false pulse FP strikingly similar to the synchronization pulse shown in the 3D glasses photosensor input (imaginary) of FIG. 5 being detected by the light-receiving sensor LS.

In this case, the 3D liquid crystal glasses GL recognizes the false pulse FP as the synchronization pulse, and carries out on-off control of the right and left liquid crystal shutters, whereby it becomes unable to visually confirm the 3D image correctly.

Accordingly, as described above in connection with FIG. 4, by securely setting each of the LD 18, LED 24, and LED 25 to the off-state at the time other than the synchronization pulse in the synchronization field, it is possible to, even when the timing of the subsequent B field is erroneously adjusted to be shifted in the forward direction, securely prevent the false pulse FP described above from occurring, and prevent the 3D liquid crystal glasses GL side from erroneously recognizing the projection timing of the 3D image.

Third Embodiment

It should be noted that in each of the first and second embodiments, although the case where projection of the 3D image is carried out has been described, when projection of a two-dimensional image is carried out, it is not necessary to alternately project the right-eye image frame and left-eye image frame as described above.

Accordingly, the field including the synchronization pulse may be annulled, and in place of that, a luminant image having luminance which improves the luminance of the projected image may be projected.

In that case, the CPU 28 recognizes whether the image to be projected is a two-dimensional image or a 3D image, and switches the projection control in the projection processing unit 13.

At the time of projection of a two-dimensional image, a W (white) field may be provided in place of the synchronization field, each of the LD 18, LED 24, and LED 25 may be set to the on-state in the W field and, on the other hand, an image corresponding to a luminance signal Y may be displayed by the micromirror element 14.

In this case, the luminance signal Y is given by a matrix operation shown below.

$$Y = 0.2988R + 0.5868G + 0.1144B$$

By providing a field to be used to project an image configured to improve the luminance at the time of projection of the two-dimensional image in this way, it is possible to improve the luminance when the two-dimensional image is projected, and it is possible to realize switching of the projection mode in a simplified manner without changing the timing to be employed at the time of projection of the primary color image from the case of projection of the 3D image.

It should be noted that if the CPU 28 recognizes whether the image to be projected is a two-dimensional image or a 3D image to switch the projection control in the projection processing unit 13, it is possible for the user to carry out each of projection of a two-dimensional image and projection of a 3D image in an optimized way without switching the projection mode each time.

As described above in detail, according to the first to third embodiment, by carrying out drive control of the light-emitting elements in the field including the synchronization pulse, it becomes possible to reduce the amount of heat generated at the time of projection of the three-dimensional image.

Fourth Embodiment

It should be noted that in each of the first to third embodiments, the case where the three different types of light-emitting elements LD 18, LED 24, and LED 25 are simultaneously turned on at the timing of the synchronization field for projection of the 3D image or at the timing of the field for improvement of luminance at the time of projection of the two-dimensional image to thereby obtain a light source of white light by the color mixture of these light-emitting elements has been described.

However, the present invention is not limited to such a case, and by simultaneously turning on, for example, two different types of light-emitting elements, i.e., the LD 18 emitting blue light for excitation of green light, and LED 24 emitting red light, a field configured to generate light having yellow color which is the compound color of these light-emitting elements may be provided, and the yellow light may be used as the synchronization pulse.

In short, it is sufficient if the input level of the light received by the sensor LS of the 3D liquid crystal glasses GL based on the color mixture of the plural colors is sufficiently higher than that of the case of monochromic light emission, and the input levels can be definitely recognized.

It should be noted that in each of the above-mentioned embodiments, the embodiment of the case where the blue light for excitation of the green light is emitted by the LD 18, and red light and blue light are emitted by the LEDs 24, and 25, respectively has been described.

However, the present invention is not intended to limit the specific emission colors, light-emitting elements, and the like if only the apparatus is an apparatus using a plurality of different types of semiconductor light-emitting elements.

The present invention can also be applied, in the same manner, to, for example, a system in which as a plurality of different types of semiconductor light-emitting elements configured to emit light of mutually different wavelength ranges, a blue LED 25 is not provided, but a blue LD and red LED are provided, further, as a color wheel, a color wheel provided with a fluorescent substance layer 20g for emission of green light, and diffusion plate area configured to diffusion-transmit blue light is used, a mirror is arranged at the position of the blue LED 25, red light is created by the red LED, and green light and blue light are created by the blue LD by time division, and thereby a color image is projected.

Besides, the present invention is not limited to the above-mentioned embodiments and, in the implementation stage, can variously be modified within the range not deviating from the gist of the invention.

Further, the functions to be executed in the above-mentioned embodiments may be appropriately combined with each other to the utmost extent to thereby be implemented.

Various stages are included in the above-mentioned embodiments, and by appropriate combination of a plurality of disclosed configuration requirements, various inventions can be extracted.

For example, even when some configuration requirements are deleted from all the configuration requirements shown in the embodiments, if an advantage can be obtained, the configuration after deletion of the configuration requirements can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a plurality of different types of light-emitting elements configured to emit light of different wavelength ranges;
   a light source drive unit configured to control a light emission state of each of the plurality of different types of light-emitting elements in accordance with i) a color image formation period in which a color image is formed by using light emitted from the plurality of different types of light-emitting elements, ii) a synchronization period in which at least two different types of light-emitting elements of the plurality of different types of light-emitting elements are simultaneously driven to output a synchronization signal synchronized with projection timing of a left-eye image or a synchronization signal synchronized with projection timing of a right-eye image, and iii) off-state periods between which the synchronization period is interposed, and in which all the plurality of different types of light-emitting elements are in the off-state;

an input unit configured to input an image signal for the left eye and an image signal for the right eye; and a projection unit configured to switch between a) an optical image corresponding to an image signal for the left eye and b) an optical image corresponding to an image signal for the right eye, which are input by the input unit, to thereby project one of the optical images by using light emitted from the plurality of different types of light-emitting elements driven by the light source drive unit.

2. The projection apparatus according to claim 1, wherein:
the light source drive unit adjusts at least one of a width and timing of the color image formation period in which each type of light-emitting element is driven, and
the projection unit adjusts at least one of a width and timing of a period in which the optical images corresponding to the image signal for the left eye and the image signal for the right eye are formed and projected.

3. The projection apparatus according to claim 1, further comprising a switching unit configured to switch between a) projection of images for the left eye and the right eye and b) projection of a two-dimensional image, wherein
the light source drive unit provides a luminance enhancement period in which the plurality of different types of light-emitting elements are simultaneously driven in place of the synchronization period and the off-state period, when the projection is switched to a projection state of the two-dimensional image by the switching unit, and
the projection unit forms an optical image corresponding to a two-dimensional luminance enhancing image by using an image signal input by the input unit in the luminance enhancement period, and projects the formed optical image, when the projection is switched to the projection state of the two-dimensional image by the switching unit.

4. The projection apparatus according to claim 3, further comprising a recognition unit configured to recognize whether an image to be projected is a two-dimensional image or a 3D image, wherein
the light source drive unit carries out switching control of the switching unit on the basis of a recognition result of the recognition unit.

5. A projection method applied to in an apparatus equipped with a plurality of different types of light-emitting elements configured to emit light of different wavelength ranges, the projection method comprising:

executing a light source driving process of controlling a light emission state of each of the plurality of different types of light-emitting elements in accordance with i) a color image formation period in which a color image is formed by using light emitted from the plurality of different types of light-emitting elements, ii) a synchronization period in which at least two different types of light-emitting elements of the plurality of different types of light-emitting elements are simultaneously driven to output a synchronization signal synchronized with projection timing of a left-eye image or a synchronization signal synchronized with projection timing of a right-eye image, and iii) off-state periods between which the synchronization period is interposed, and in which all the plurality of different types of light-emitting elements are in the off-state;

executing an input process of inputting an image signal for the left eye and an image signal for the right eye; and executing a projecting process of switching between a) an optical image corresponding to an image signal for the left eye and b) an optical image corresponding to an image signal for the right eye, which are input in the input process, to thereby project one of the optical images by using light emitted from the plurality of different types of light-emitting elements driven in the light source driving process.

6. A non-transitory computer-readable storage medium having program code stored thereon for controlling a computer of an apparatus equipped with a plurality of different types of light-emitting elements configured to emit light of different wavelength ranges, the program code comprising:

executing a light source driving process of controlling a light emission state of each of the plurality of different types of light-emitting elements in accordance with i) a color image formation period in which a color image is formed by using light emitted from the plurality of different types of light-emitting elements, ii) a synchronization period in which at least two different types of light-emitting elements of the plurality of different types of light-emitting elements are simultaneously driven to output a synchronization signal synchronized with projection timing of a left-eye image or a synchronization signal synchronized with projection timing of a right-eye image, and iii) off-state periods between which the synchronization period is interposed, and in which all the plurality of different types of light-emitting elements are in the off-state;

executing an input process of inputting an image signal for the left eye and an image signal for the right eye; and executing a projecting process of switching between a) an optical image corresponding to an image signal for the left eye and b) an optical image corresponding to an image signal for the right eye, which are input in the input process, to thereby project one of the optical images by using light emitted from the plurality of different types of light-emitting elements driven in the light source driving process.

* * * * *